(12) United States Patent
Roske et al.

(10) Patent No.: US 10,495,187 B2
(45) Date of Patent: Dec. 3, 2019

(54) VEHICLE TRANSMISSION AND DRIVETRAIN

(71) Applicant: ZF Friedrichshafen AG, Friedrichshafen (DE)

(72) Inventors: Michael Roske, Friedrichshafen (DE); Raffael Kuberczyk, Ravensburg (DE); Juri Pawlakowitsch, Kressbronn (DE); Bernd Unseld, Ravensburg (DE); Thomas Rosemeier, Meckenbeuren (DE); Peter Ziemer, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 131 days.

(21) Appl. No.: 15/678,352

(22) Filed: Aug. 16, 2017

(65) Prior Publication Data

US 2018/0051782 A1 Feb. 22, 2018

(30) Foreign Application Priority Data

Aug. 19, 2016 (DE) .......................... 10 2016 215 555

(51) Int. Cl.
*F16H 3/66* (2006.01)
*B60K 6/365* (2007.10)
(Continued)

(52) U.S. Cl.
CPC ................ *F16H 3/66* (2013.01); *B60K 6/365* (2013.01); *B60K 6/48* (2013.01); *B60K 6/547* (2013.01);
(Continued)

(58) Field of Classification Search
CPC ....... F16H 2200/0052; F16H 2200/201; F16H 2200/2043; F16H 2200/2064;
(Continued)

(56) References Cited

U.S. PATENT DOCUMENTS 6,585,066 B1 * 7/2003 Koneda ................. B60K 6/365
 180/165
8,113,983 B2 2/2012 Gumpoltsberger
(Continued)

FOREIGN PATENT DOCUMENTS

DE 102007022776 A1 12/2004
DE 102011079716 A1 1/2013
(Continued)

OTHER PUBLICATIONS

German Search Report DE102016215555.5, dated Jul. 27, 2017.
(Continued)

*Primary Examiner* — Jacob S. Scott
*Assistant Examiner* — Lori Wu
(74) *Attorney, Agent, or Firm* — Dority & Manning, P.A.

(57) ABSTRACT

A transmission includes a drive shaft, an output shaft, three planetary gear sets, and five shift elements, the first and second planetary gear sets are negative or minus gear sets. The third planetary gear set comprises three elements. The drive shaft is connected to the first element. A ring gear of the first planetary gear set is connected to the second element. The drive shaft is connectable to a sun gear of the first planetary gear set through the first shift element. The third element is rotationally fixable through the second shift element. The sun gear of the second planetary gear set is rotationally fixable through the third shift element. The planetary carrier of the second planetary gear set is rotationally fixable through the fourth shift element. The drive shaft is connectable to the planetary carrier of the second planetary gear set through the fifth shift element.

16 Claims, 9 Drawing Sheets

(51) Int. Cl.
　　*B60K 6/48* (2007.10)
　　*B60K 6/547* (2007.10)
　　*F16H 3/44* (2006.01)

(52) U.S. Cl.
　　CPC ... *B60K 2006/4825* (2013.01); *B60Y 2200/92* (2013.01); *F16H 2003/442* (2013.01); *F16H 2200/0052* (2013.01); *F16H 2200/201* (2013.01); *F16H 2200/2043* (2013.01); *Y10S 903/911* (2013.01); *Y10S 903/919* (2013.01)

(58) Field of Classification Search
　　CPC .... F16H 2200/2094; F16H 3/66; F16H 3/666; F16H 2003/442; F16H 37/082; B60K 6/365; B60K 6/48; B60K 6/547; B60K 2006/4825
　　See application file for complete search history.

(56) References Cited

U.S. PATENT DOCUMENTS

| | | | |
|---|---|---|---|
| 9,080,648 B2 | 7/2015 | Ziemer et al. | |
| 9,631,706 B2 | 4/2017 | Kato et al. | |
| 2002/0128117 A1* | 9/2002 | Schroder | B60K 17/3462 477/72 |
| 2013/0260942 A1 | 10/2013 | Garcia et al. | |
| 2016/0305510 A1* | 10/2016 | Kato | F16H 3/66 |
| 2017/0341502 A1* | 11/2017 | Scholle | B60K 6/365 |

FOREIGN PATENT DOCUMENTS

| | | |
|---|---|---|
| DE | 10201207017 A1 | 10/2013 |
| DE | 102013205289 A1 | 10/2013 |
| DE | 112015000224 T5 | 8/2016 |

OTHER PUBLICATIONS

Herbert W. Muller Die umlaufgetriebe—Auslegung und vielseitige Anwendungen (The planetary gears-design and versatile applications), 2. Auflage (edition), Springer, Berlin/Heidelberg, 1998, S. 36-40M ISBN 978-3-642-63698-1.

\* cited by examiner

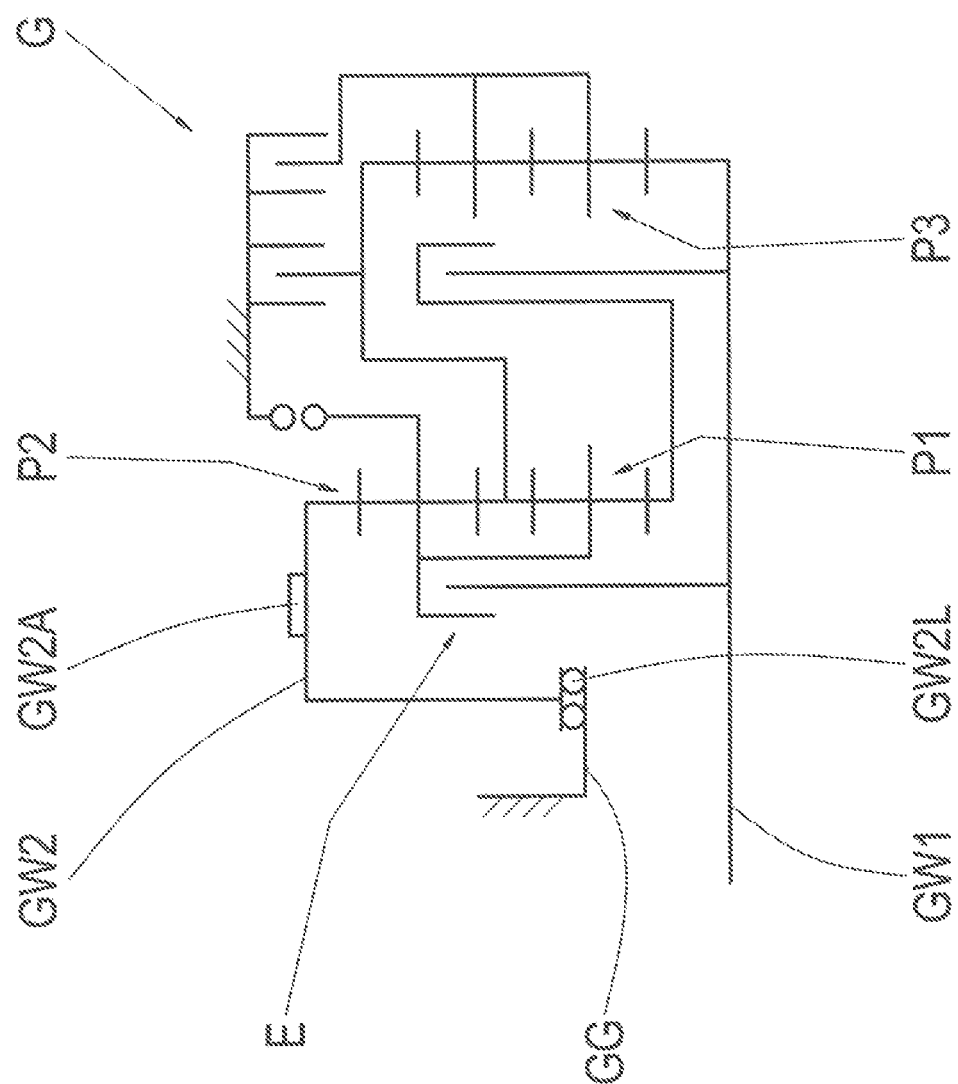

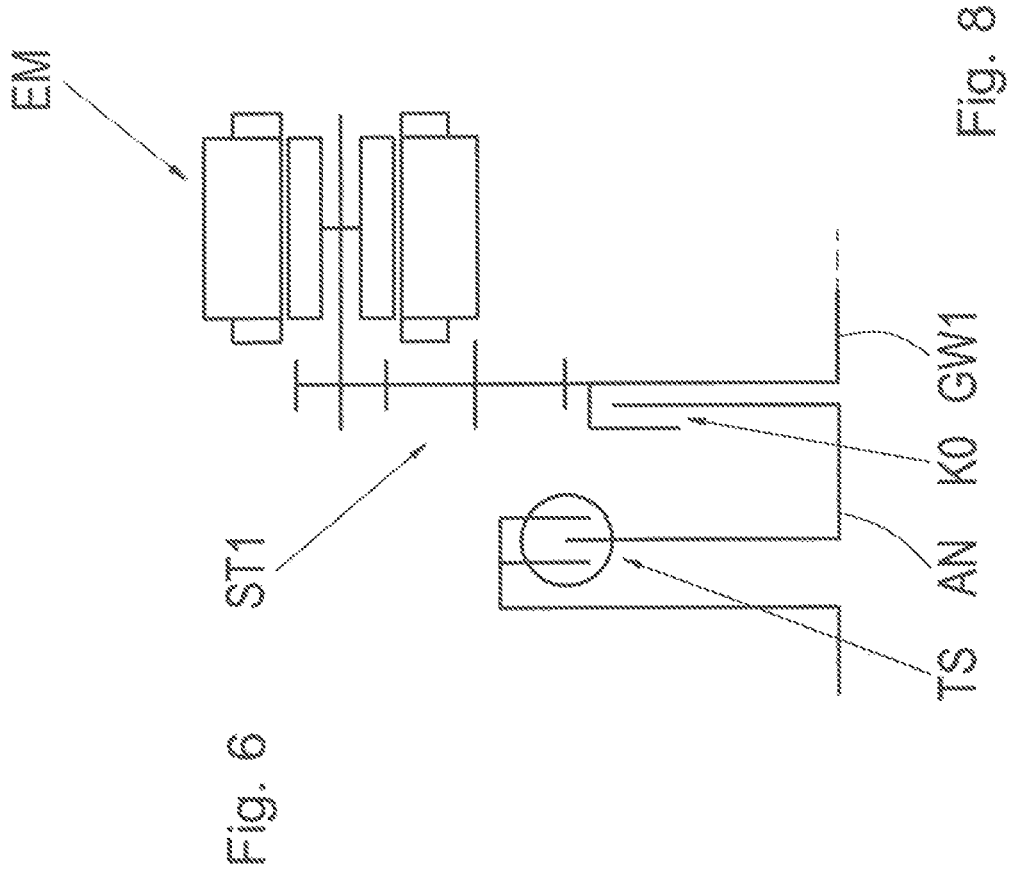
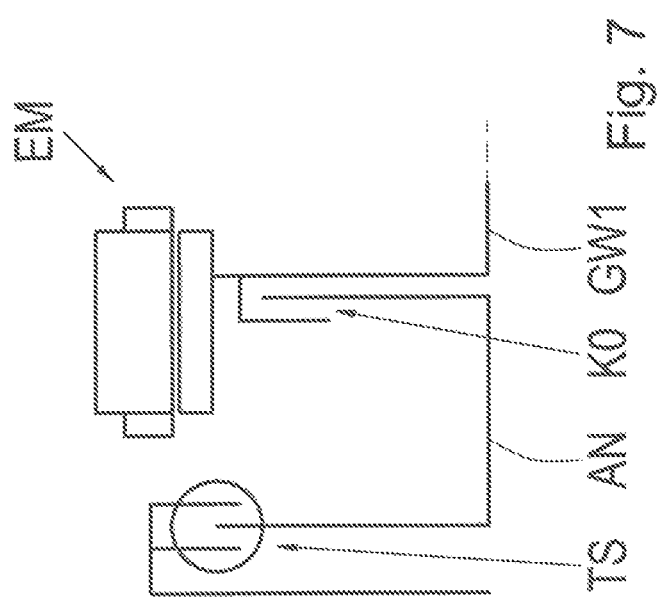

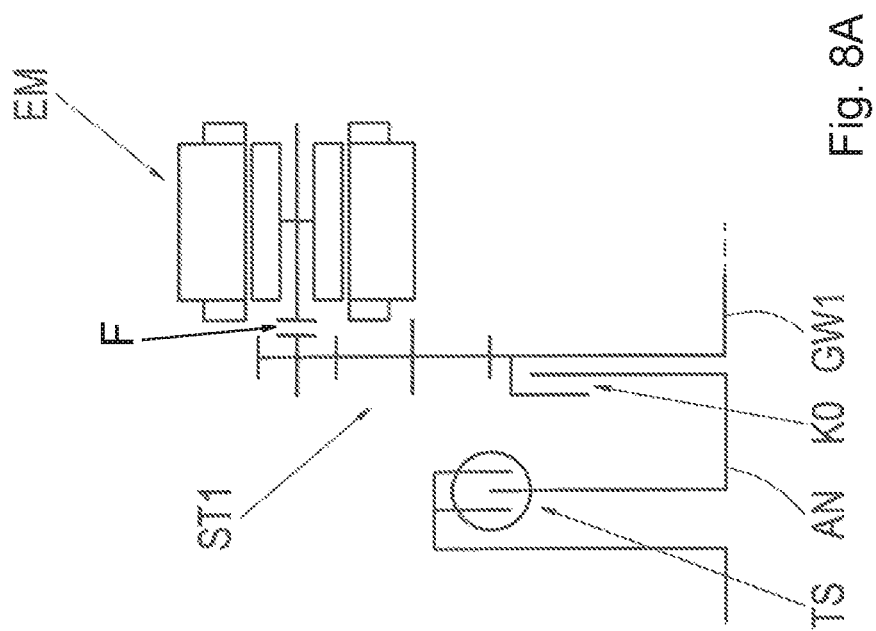

VEHICLE TRANSMISSION AND DRIVETRAIN

FIELD OF THE INVENTION

The present subject matter relates generally to a transmission for a motor vehicle and a drive train for a motor vehicle with such a transmission. In this context a transmission denotes, in particular, a multi-speed transmission, in which a plurality of gears, i.e., fixed gear ratios between the drive shaft and the output shaft of the transmission, can be shifted, preferably automatically, by shift elements. In this case the shift elements are, for example, clutches or brakes. Such transmissions are used primarily in motor vehicles to adjust the rotational speed and the torque output characteristic of the drive unit to the driving resistance of the vehicle in a suitable manner.

BACKGROUND

The patent application DE 10 2012 207 017 A1 of the applicant describes a multi-speed transmission for use in a front traverse drive of a motor vehicle. In the case of such transmissions it is important to ensure a short axial constructional length, since the transmission is typically between an internal combustion engine and a wheel suspension or a structure of the motor vehicle. In addition, the output of the transmission should be arranged as close to the drive side of the transmission as possible, so that the side shafts between the differential transmission of the drive axle and the driving gears may be as long as possible. Such a design reduces the flexion angle of the side shaft joints and, thus, their load during operation.

SUMMARY OF THE INVENTION

An example object of the present invention is to modify the multi-speed transmission, known from the prior art, in such a way that the output of the transmission is arranged closer to the drive side of the transmission.

Thus, the object may be achieved by a multi-speed transmission with a drive shaft, an output shaft, first, second and third planetary gear sets, and first, second, third, fourth and fifth shift elements. In this case the first and second planetary gear sets are negative or minus gear sets and are arranged in a common gear set plane. The gear set plane is aligned perpendicular to the axis of rotation of the drive shaft. The term "arrangement in a common gear set plane" shall mean that a greater portion of the elements of the two planetary gear sets is arranged in the common gear set plane.

As is known in the art, a planetary gear set includes a sun gear, a planetary carrier and a ring gear. The planetary gears, which mesh with the gear teeth of the sun gear and/or with the gear teeth of the ring gear, are mounted rotatably on the planetary carrier. A negative or minus gear set denotes a planetary gear set including a planetary carrier, on which the planetary gears are rotatably mounted, a sun gear and a ring gear. In a negative or minus gear set, the gear teeth of at least one of the planetary gears mesh with both the gear teeth of the sun gear and the gear teeth of the ring gear, so that the ring gear and the sun gear rotate in opposite directions of rotation when the sun gear rotates and the planetary carrier is stationary. The difference between a positive or plus gear set and the above described negative or minus planetary gear set is that the positive or plus gear set comprises inner and outer planetary gear sets, which are rotatably mounted on the planetary carrier. In a positive or plus gear set, teeth of the inner planetary gears mesh with the gear teeth of the sun gear and with the gear teeth of the outer planetary gears, while the gear teeth of the outer planetary gears mesh with the gear teeth of the ring gear. The result is that when the planetary carrier is stationary, the ring gear and the sun gear rotate in the same direction of rotation.

The third planetary gear set includes a first element, a second element and a third element. The first element is always a sun gear of the third planetary gear set. If the third planetary gear set is a negative or minus gear set, then the second element is a planetary carrier of the third planetary gear set and the third element is a ring gear of the third planetary gear set. If the third planetary gear set is a positive or plus gear set, then the second element is the ring gear of the third planetary gear set and the third element is the planetary carrier of the third planetary gear set.

The drive shaft is permanently connected to the first element of the third planetary gear set. The output shaft is permanently connected to a ring gear of the second planetary gear set. A ring gear of the first planetary gear set is permanently connected to a sun gear of the second planetary gear set and to the second element of the third planetary gear set. A planetary carrier of the first planetary gear set is permanently connected to a planetary carrier of the second planetary gear set.

By engaging the first shift element, the drive shaft is connectable to a sun gear of the first planetary gear set. By engaging the second shift element, the third element of the third planetary gear set is fixable in a rotationally fixed manner. By engaging the third shift element the sun gear of the second planetary gear set is fixable in a rotationally fixed manner. By engaging the fourth shift element the web of the second planetary gear set is fixable in a rotationally fixed manner. By engaging the fifth shift element the drive shaft is connectable to the planetary carrier of the second planetary gear set.

According to the invention, the gear teeth formed on the output shaft, which transfer power to a transmission-internal or transmission-external differential transmission, and the three planetary gear sets are arranged in the following axial order of sequence: gear teeth, first planetary gear set and second planetary gear set in the common gear set plane, third planetary gear set. In this case the "axial sequence" relates to the axis of rotation of the drive shaft or to each axis aligned paraxially thereto. As compared to the transmission known from the prior art, it is possible to decease the axial design length of the transmission even further by this arrangement. In addition, it is now possible to arrange the output gear teeth closer to the drive interface of the transmission. The differential transmission is a constituent part of the transmission when it is disposed in the same housing as the transmission.

Preferably the first shift element is arranged axially between the gear set plane, in which the first and second planetary gear sets are arranged, and the third planetary gear set. This aspect is also conducive to arranging the output gear closer to the drive interface of the transmission.

According to a preferred embodiment, the third shift element is arranged at least partially radially outside the first shift element. Therefore, elements of the first and third shift elements are arranged in a common plane. Such a radial nesting makes it possible to keep the axial design length of the transmission short.

The elements of the second shift element and the elements of the third planetary gear set are arranged preferably in a common plane, which is aligned perpendicular to the axis of rotation of the drive shaft. Such a radial nesting makes it possible to keep the axial design length of the transmission short.

According to one possible embodiment, the fourth shift element is arranged axially directly next to the third shift element. As an alternative, the fourth shift element may be arranged radially inside a rolling bearing, which supports the output shaft at least radially with respect to a rotationally fixed component of the transmission. Both variants are conducive to an axially short design of the transmission.

In principle, any of the five shift elements can be a positive engaging shift element, such as for example, a claw clutch or a frictionally engaging shift element such as a multi-disk clutch. The fourth shift element is preferably a positive engaging shift element. In the engaged state, the positive engaging shift elements produce the connection by a positive engagement and in the disengaged state, the positive engaging shift elements are distinguished by smaller drag losses than the frictionally engaging shift elements. Since the drag losses are smaller in the disengaged state, the efficiency of the transmission is improved. According to an alternative embodiment, the fourth shift element may be a non-positive engaging frictional shift element, the frictional faces of which have exclusively no friction lining. In other words, the disk-shaped base body of each disk of the frictional shift element does not have a friction lining applied on the disk. However, the frictional faces of the individual disks or all of the disks of such a frictional shift element may be heat treated, for example, nitrogenized. Such frictional shift elements are designed for high compressive loads per surface area and, therefore, can have a small frictional face and few disks. As result, the drag losses of such a shift element can be reduced in the disengaged state.

Preferably the gear teeth of the output shaft are arranged axially between the fifth shift element and the gear set plane, in which the first and second planetary gear sets are arranged. According to an alternative embodiment, the fifth shift element may be arranged radially inside the gear teeth of the output shaft. Both variants are conducive to an axially short design of the transmission.

According to a preferred embodiment, the third planetary gear set is a positive or plus gear set. This feature makes it possible to improve the gear stepping of the transmission.

The transmission preferably comprises an electric motor with a rotationally fixed stator and a rotatable rotor, with the rotor being in constant or shiftable operative connection to the drive shaft. In this case the constant or shiftable connection may be a direct connection or an indirect connection. In the case of a direct, rotationally fixed attachment of the rotor to the drive shaft the electric motor is arranged coaxially to the drive shaft. In an embodiment as an indirect connection, the rotor is permanently or shiftably attached to the drive shaft by a fixed gear ratio, for example, by a flexible drive, by at least one spur gear set, or by an additional planetary gear set, with one element of this planetary gear set being fixed in a rotationally fixed manner. One example of a flexible drive is a chain drive.

According to a preferred embodiment, the electric motor is arranged paraxially to the drive shaft, as a result of which the axial design length of the transmission can be kept short.

The transfer of power between the gear teeth of the output shaft and the transmission-internal or transmission-external differential transmission is preferably by a two stage spur gear set, by a chain drive, or by a single stage spur gear set and downstream planetary gear set. All of the variants are conducive to an axially short design of the transmission.

The transmission may comprise one or more torsional vibration dampers, which damp the rotational vibrations and which are preferably arranged in operative connection between the drive interface of the transmission and the drive shaft. In this way the rotational vibrations, which are generated by a transmission-external drive unit, may be damped in the direction of the drive shaft.

Furthermore, the transmission may comprise a disconnect clutch. By engaging the disconnect clutch, that shaft of the transmission, at which the interface to the transmission-external drive unit is formed, is connected to the drive shaft. This shaft may also be referred to as the connecting shaft. The disconnect clutch may be a non-positive engaging or a positive engaging clutch.

In principle, the transmission may be preceded by a startup element in a manner known from the prior art, for example, by a hydrodynamic torque converter or a friction clutch. Such a startup element may also be an integral part of the transmission, in that one or two shift elements of the transmission are used as the startup element. When the transmission is used in the drive train of a motor vehicle, the startup element makes a startup operation feasible by facilitating a slip state between the transmission-external drive unit, which is an internal combustion engine, and the output shaft of the transmission.

The transmission may be a constituent part of a drive train for a motor vehicle. The drive train comprises not only the transmission, but also an internal combustion engine, which is connected or connectable to the drive shaft of the transmission in a rotationally elastic manner by at least one torsional vibration damper. Between the drive shaft and the internal combustion engine there may be a disconnect clutch, which may be a constituent part of the transmission. The output shafts of the differential transmission are connected to the driving gears of the motor vehicle. If the transmission comprises the electric motor, then the drive train permits a plurality of driving modes of the motor vehicle. In an electric driving mode, the motor vehicle is driven by the electric motor of the transmission. In an internal combustion engine mode, the motor vehicle is driven by the internal combustion engine. In a hybrid mode, the motor vehicle is driven by both the internal combustion engine and also by the electric motor of the transmission.

A permanent connection is referred to as a connection between two elements that always exists. Such permanently connected elements always rotate with the same dependence between their rotational speeds. In a permanent connection between two elements there is no shift element. Therefore, a permanent connection has to be distinguished from a shiftable connection, wherein two elements are "connectable" or "fixable" by a shift element. A permanently rotationally fixed connection is referred to as a connection between two elements that always exists; and, hence, its connected elements always have the same rotational speed.

The term "engaging a shift element" means an operation, in which the shift element is actuated in such a way that at the end of the engaging operation said shift element transfers a high degree of torque. While positive engaging shift elements in the "engaged" state do not allow a rotational speed difference, non-positive engaging shift elements in the "engaged" state do permit either intentionally or unintentionally the formation of a small rotational speed difference.

Both the features specified in the patent claims and the features specified in the following exemplary embodiment of the transmission according to the system are suitable, in each case individually, or in any desired combination with one another, for refining the subject matter according to the invention.

Further advantages and advantageous embodiments of the transmission according to the invention will emerge from the patent claims and from the exemplary embodiments described in principle below with reference to the drawings.

BRIEF DESCRIPTION OF THE DRAWINGS

Exemplary embodiments of the invention are described in detail below with reference to the accompanying figures. The following is shown:

FIG. 5 shows a schematic form of a transmission in accordance with a fourth exemplary embodiment of the invention;

FIG. 6 shows an engagement sequence diagram of the transmission;

FIGS. 7 and 8 each show a variant of the attachment of an electric motor to the transmission; and FIG. 8A shows another variant of the attachment of an electric motor to the transmission.

DETAILED DESCRIPTION

Figure 1:
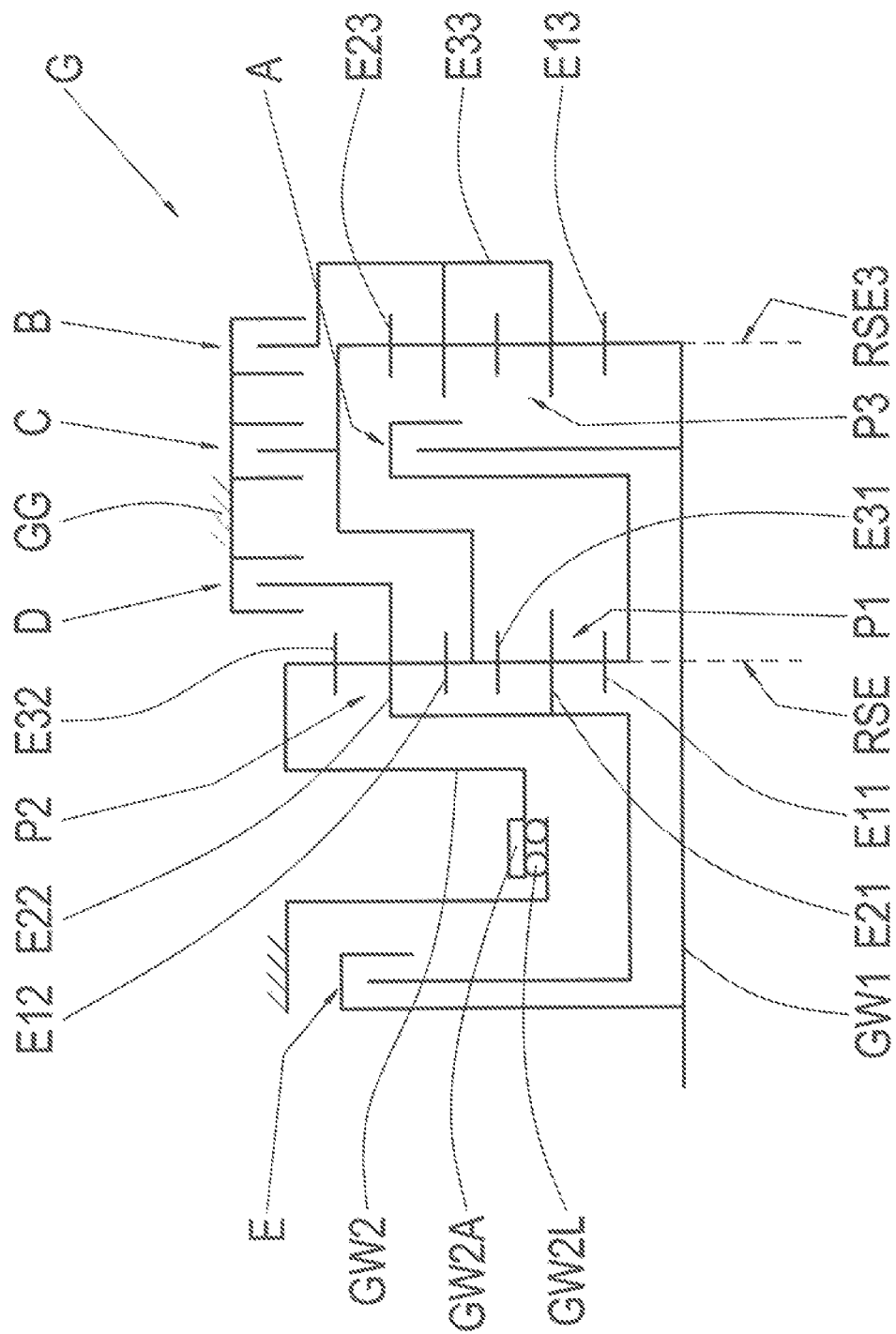
FIG. 1 shows a schematic form of a transmission in accordance with a first exemplary embodiment of the invention.

FIG. 1 shows a schematic form of a transmission G in accordance with a first exemplary embodiment of the invention. The transmission G comprises a drive shaft GW1, an output shaft GW2, a first planetary gear set P1, a second planetary gear set P2, a third planetary gear set P3, a first shift element A, a second shift element B, a third shift element C, a fourth shift element D, and a fifth shift element E. The first planetary gear set P1 and the second planetary gear set P2 are each a negative or minus gear set and are arranged in a common gear set plane RSE. In this context the first planetary gear set P1 is arranged radially inside the second planetary gear set P2. The third planetary gear set P3 is a positive or plus gear set and is arranged in a plane RSE3, which is aligned perpendicular to the axis of rotation of the drive shaft GW1. The gear set plane RSE is also aligned perpendicular to the axis of rotation of the drive shaft GW1.

Figure 1A:
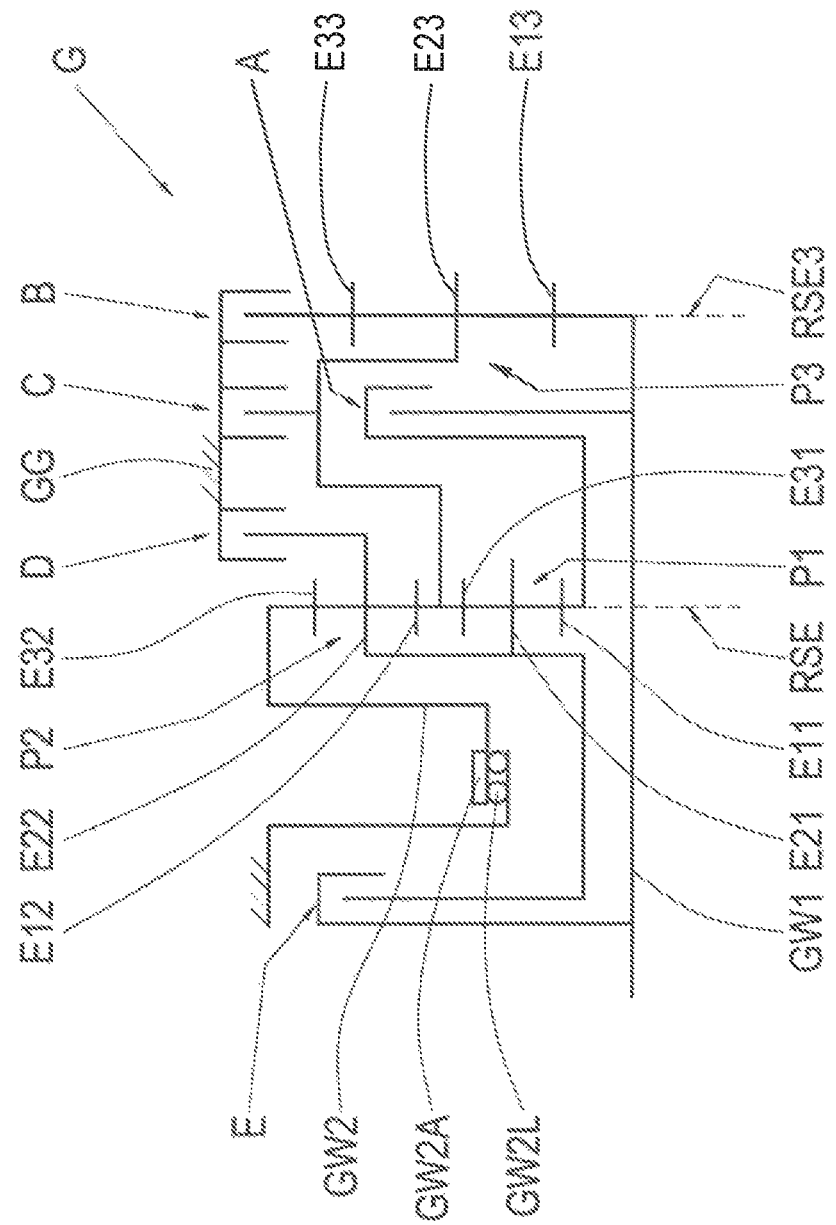
FIG. 1A shows a schematic form of a transmission corresponding to the first exemplary embodiment of the invention in accordance with aspects of the present subject matter, particularly with a third planetary gear set of the transmission being a minus gear set.

The third planetary gear set P3 comprises a first element E13, a second element E23, and a third element E33. The first element E13 is the sun gear of the third planetary gear set P3. The second element E23 is the ring gear of the third planetary gear set P3. The third element E33 is the planetary carrier of the third planetary gear set P3. If the third planetary gear set P3 were a negative or minus gear set, as shown in FIG. 1A, then the first element E13 would still be the sun gear of the third planetary gear set P3; the second element E23 would be the planetary carrier of the third planetary gear set P3; and the third element E33, would be the ring gear of the third planetary gear set P3.

The drive shaft GW1 is permanently connected to the first element E13. The output shaft is permanently connected to a ring gear E32 of the second planetary gear set P2. A ring gear E31 of the first planetary gear set P1 is permanently connected to a sun gear E12 of the second planetary gear set P2 and to the second element E23 of the third planetary gear set P3. A planetary carrier E21 of the first planetary gear set P1 is permanently connected to a planetary carrier E22 of the second planetary gear set P2.

By engaging the first shift element A, the drive shaft GW1 is connectable to a sun gear E11 of the first planetary gear set P1. By engaging the second shift element B, the third element E33 is fixable in a rotationally fixed manner. By engaging the third shift element C, the sun gear E12 of the second planetary gear set P2 and, permanently connected thereto, the ring gear E31 of the first planetary gear set P1 are fixable in a rotationally fixed manner. By engaging the fourth shift element D, the planetary carrier E22 of the second planetary gear set P2 and, permanently connected thereto, the planetary carrier E21 of the first planetary gear set P1 are fixable in a rotationally fixed manner. By engaging the fifth shift element E, the drive shaft GW1 is connectable to the web E22 of the second planetary gear set P2 and, permanently connected thereto, the planetary carrier E21 of the first planetary gear set P1.

The output shaft GW2 has gear teeth GW2A on one section, these teeth transfer power between the output shaft GW2 and a transmission-internal or transmission-external differential transmission, not shown in FIG. 1. The gear teeth are a function of the mechanism of the power transfer, for example, as chain gear teeth for a power transfer by a chain drive or as helical spur gear teeth for a power transfer by a spur gear drive. A rolling bearing GW2L is arranged directly radially inside the gear teeth GW2A; and this rolling bearing is suitable to support the output shaft GW2 at least radially with respect to a rotationally fixed component of the transmission G, for example, with respect to a bearing bracket that is connected to a housing GG of the transmission G in a rotationally fixed manner.

The gear teeth GW2A are arranged axially between the first shift element E and the gear set plane RSE. The gear set plane RSE is arranged axially between the gear teeth GW2A and the fourth shift element D. The fourth shift element D is arranged axially between the gear set plane RSE and the first and third shift elements A, C, which are nested inside one another in the radial direction. The first and third shift elements A, C are arranged axially between the fourth shift element D and the third planetary gear set P3. The second shift element B is arranged radially outside the third planetary gear set P3 in the plane RSE3.

The five shift elements A to E are shown in schematic form as frictionally engaging shift elements. This is to be regarded solely as an example. Each of the five shift elements A to E could also be a positive engaging shift element. In this case FIG. 2 shows a second exemplary embodiment of the transmission G, in which the fourth shift element D in an unmodified position is a positive engaging shift element.

Figure 3:
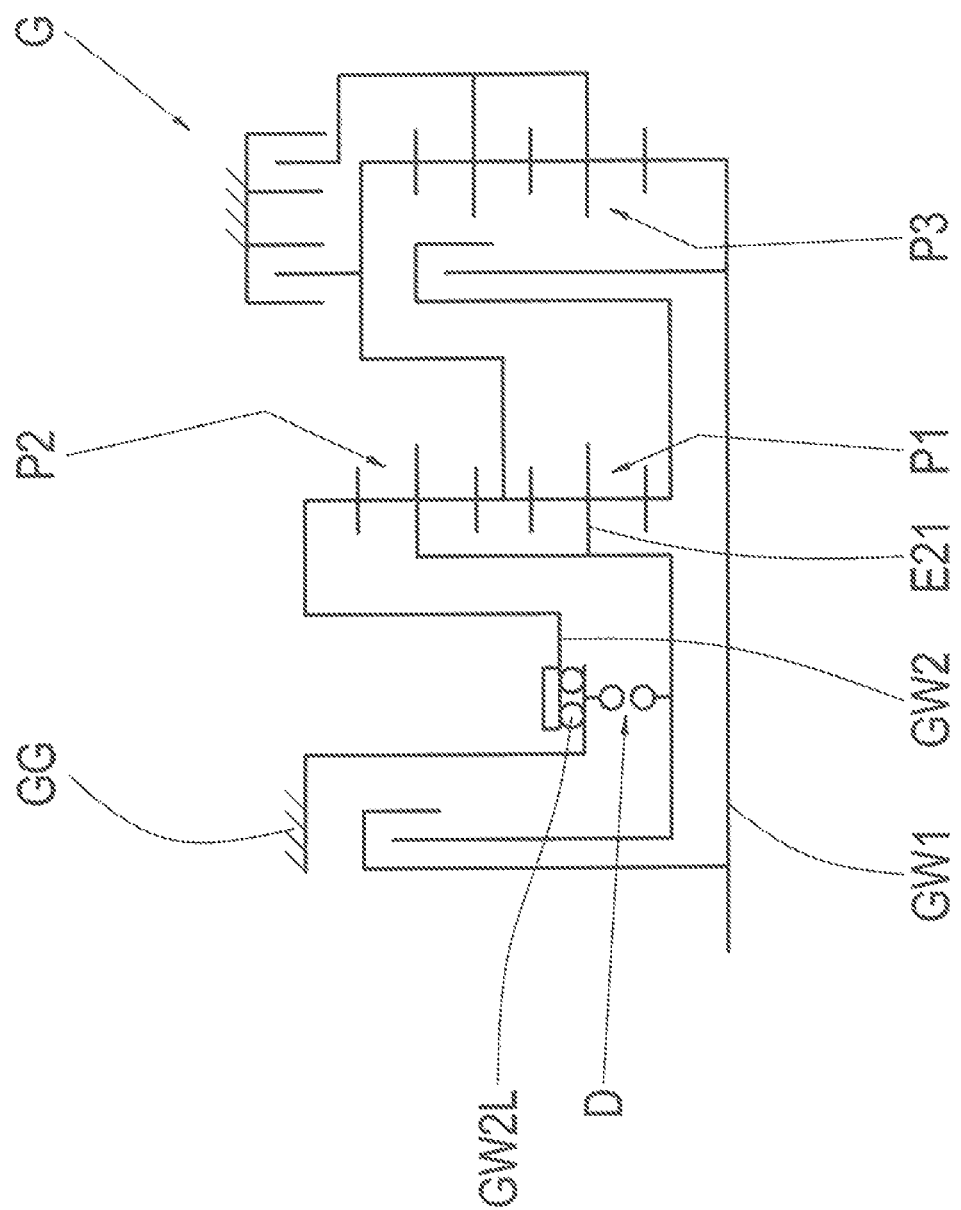
FIG. 3 shows a schematic form of a transmission in accordance with a third exemplary embodiment of the invention.

FIG. 3 shows a schematic form of a transmission G corresponding to a third exemplary embodiment of the invention, which essentially corresponds to the first exemplary embodiment shown in FIG. 1. The fourth shift element D is a positive engaging shift element and is now arranged radially inside the output shaft bearing arrangement GW2L.

Figure 4:
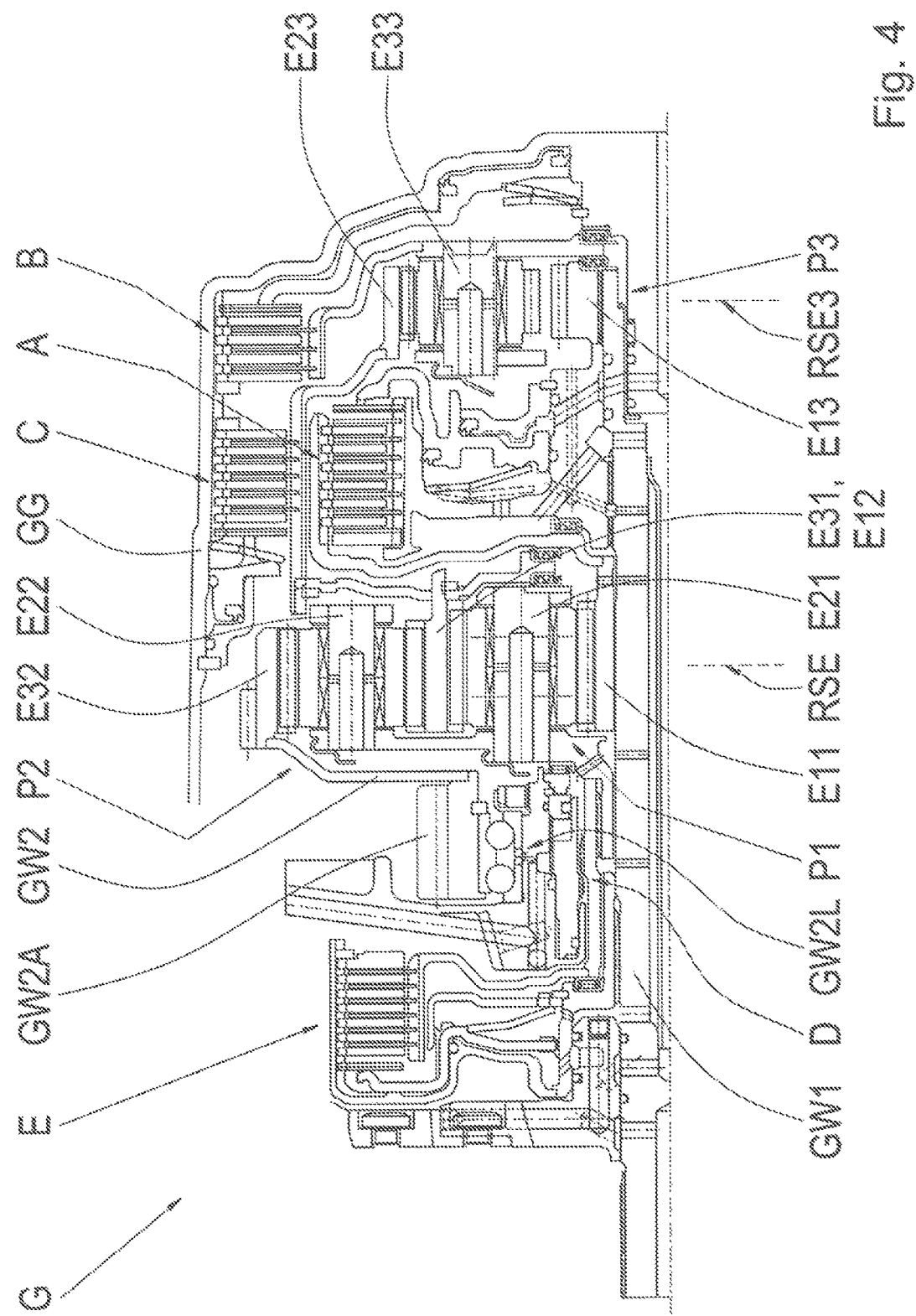
FIG. 4 shows a sectional view of a transmission in accordance with the third exemplary embodiment.

This small effective diameter leads to a decrease in the complexity of producing the positive engaging connection. FIG. 4 shows a sectional view of a transmission G in accordance with the third exemplary embodiment.

Figure 2:
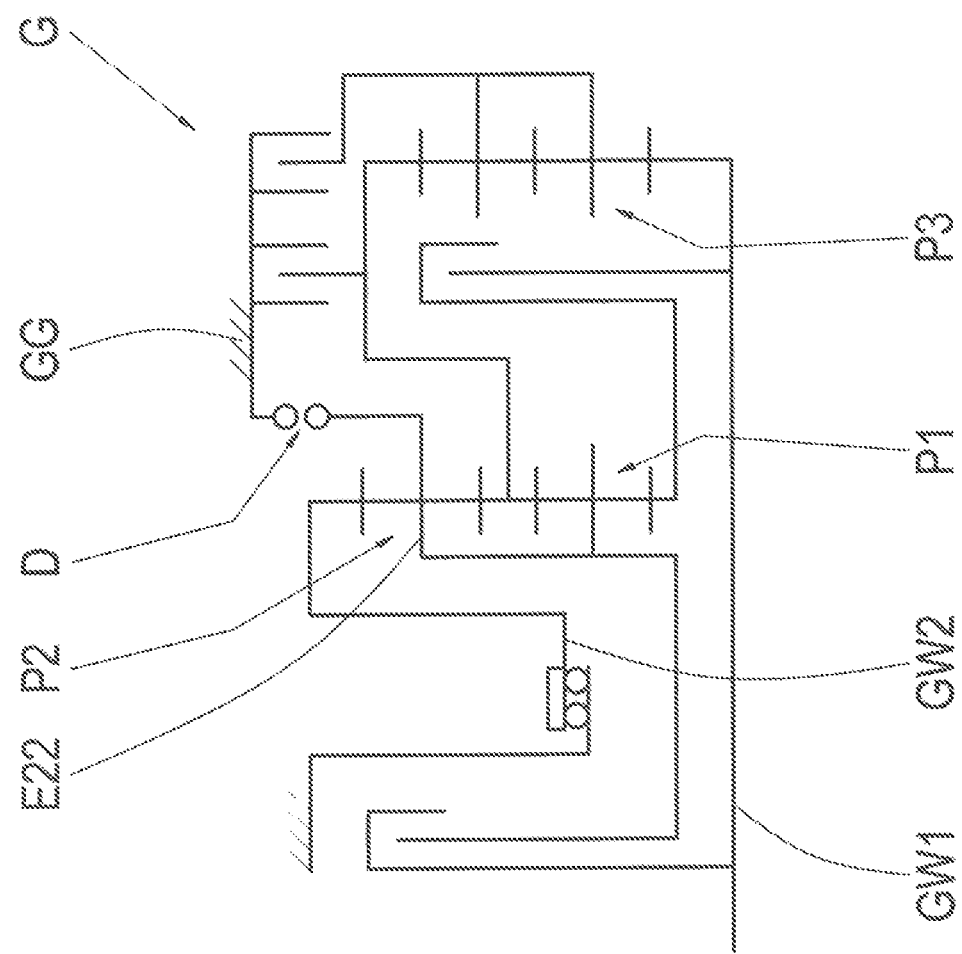
FIG. 2 shows a schematic form of a transmission in accordance with a second exemplary embodiment of the invention.

FIG. 5 shows a schematic form of a transmission G corresponding to a fourth exemplary embodiment of the invention, which essentially corresponds to the second exemplary embodiment shown in FIG. 2. The fifth shift element E is now arranged radially inside the output shaft gear teeth GW2A.

FIG. 6 shows an engagement sequence diagram, which is applicable to all of the exemplary embodiments of the transmission G. The transmission G is configured to form six forward gears 1 to 6 as well as a reverse gear R between the drive shaft GW1 and the output shaft GW2. The engagement sequence diagram indicates by an X which shift elements A to E are to be engaged each of the gears 1 to 6, R. The first forward gear 1 is produced by engaging the first shift element A and the fourth shift element D. The second forward gear 2 is produced by engaging the first shift element A and the third shift element C. The third forward gear 3 is produced by engaging the first shift element A and the second shift element B. The fourth forward gear 4 is produced by engaging the first shift element A and the fifth shift element E. The fifth forward gear 5 is produced by engaging the second shift element B and the fifth shift element E. The sixth forward gear 6 is produced by engaging the third shift element C and the fifth shift element E. The reverse gear R is produced by engaging the second shift element B and the fourth shift element D.

FIG. 7 shows a first variant for attaching an electric motor EM to the drive shaft GW1 of the transmission G, wherein the electric motor EM is arranged coaxially to the drive shaft GW1. The electric motor EM comprises a rotationally fixed stator, which envelops a rotor that is mounted rotatably. The rotor is connected to the drive shaft GW1 in a rotationally fixed manner. A disconnect clutch K0 is arranged radially inside the rotor. By engaging the disconnect clutch K0, a connecting shaft AN is connectable to the drive shaft GW1. The disconnect clutch K0 is shown, by way of example, as a frictionally engaging element. As an alternative, the disconnect clutch K0 could also be a positive engaging element. A torsional vibration damper TS is arranged between two sections of the connecting shaft AN.

FIG. 8 shows a second variant for attaching the electric motor EM to the drive shaft GW1 of the transmission G, wherein the electric motor EM is now arranged paraxially to the drive shaft GW1. In this case, the rotor is permanently connected to the drive shaft GW1 by a spur gear transmission ST1, by which the axial distance between the drive shaft GW1 and the electric motor EM is bridged. The disconnect clutch K0 is arranged at least partially radially inside the spur gear transmission ST1. FIG. 8A shows another variant for attaching the electric motor EM to the drive shaft GW1 of the transmission G, where the variant of FIG. 8A substantially corresponds to the second variant shown in FIG. 8 except that the rotor is shiftably connected to the spur gear transmission ST1 by a further shift element, for example, a disconnect clutch F.

Figure 9:
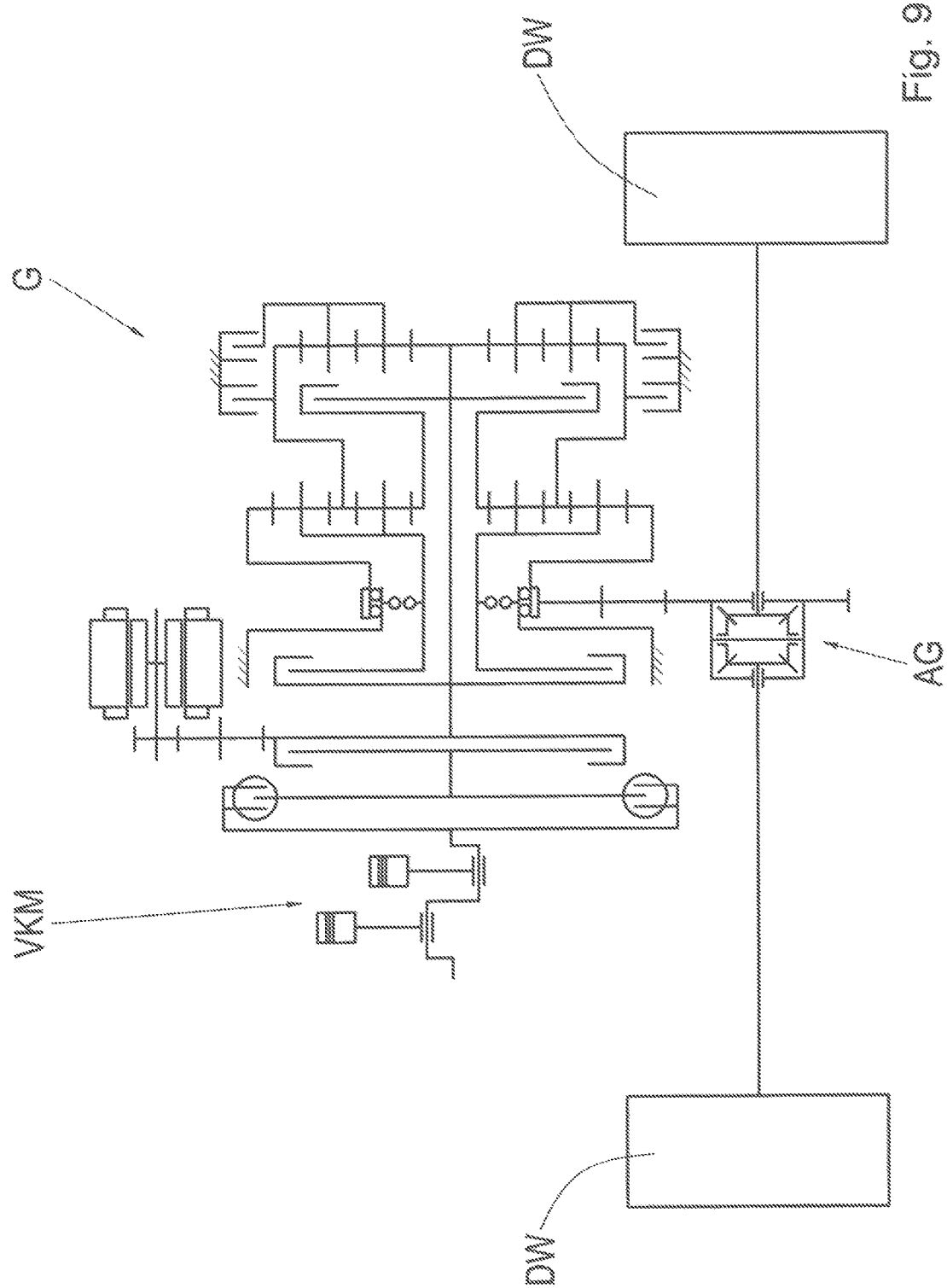
FIG. 9 shows a drive train of a motor vehicle.

FIG. 9 shows a schematic form of a drive train of a motor vehicle. An internal combustion engine VKM is connected to the connecting shaft AN of the transmission G by the torsional vibration damper TS. The transmission G, shown in FIG. 9, corresponds to the third exemplary embodiment of the invention shown in FIG. 3, with the electric motor EM arranged paraxially to the drive shaft GW1. This is to be regarded solely as an example. The internal combustion engine VKM could also be connected directly to the drive shaft GW1 of the transmission G by the torsional vibration damper TS. The drive train could be carried out with any one of the concrete exemplary embodiments, with or without the electric motor EM. The drive train could include a hydrodynamic torque converter arranged in the force flow between the internal combustion engine VKM and the drive shaft GW1 of the transmission G. Such a torque converter could also comprise a lock-up clutch. A person skilled in the art will freely configure the arrangement and spatial position of the individual components of the drive train as a function of the external boundary conditions. The power, applied to the output shaft GW2, is distributed through the differential transmission AG to the driving wheels DW of the motor vehicle. In FIG. 9 the differential transmission AG, the power transfer from the output shaft GW2 to the differential transmission AG, the electric motor EM, and the power transfer between the electric motor EM and the drive shaft GW1 are shown in one sectional plane. Even this is to be regarded solely as an example. The selected representation is intended only to illustrate the construction. The differential transmission AG and the electric motor EM may also be arranged in different sectional planes.

Modifications and variations can be made to the embodiments illustrated or described herein without departing from the scope and spirit of the invention as set forth in the appended claims.

LIST OF REFERENCE NUMERALS AND CHARACTERS

G transmission
GW1 drive shaft
AN connecting shaft
GW2 output shaft
GW2A gear teeth
GW2L bearing arrangement
P1 first planetary gear set
E11 sun gear
E21 planetary carrier
E31 ring gear
P2 second planetary gear set
E12 sun gear
E22 planetary carrier
E32 ring gear
P3 third planetary gear set
E13 first element
E23 second element
E33 third element
A first shift element
B second shift element
C third shift element
D fourth shift element
E fifth shift element
GG housing
RSE gear set plane
RSE3 plane
EM electric motor
K0 disconnect clutch
TS torsional vibration damper
ST1 spur gear set
1 to 6 first to sixth forward gears
R reverse gear
VKM internal combustion engine
AG differential transmission
DW driving gear

The invention claimed is:

1. A transmission (G) for a motor vehicle, comprising:
   a drive shaft (GW1);
   an output shaft (GW2);
   a plurality of planetary gear sets having first, second and third planetary gear sets (P1, P2, P3); and
   a plurality of shift elements having first, second, third, fourth and fifth shift elements (A, B, C, D, E);
   wherein
   the first and the second planetary gear sets (P1, P2) are negative gear sets and are in a common gear set plane (RSE) that is perpendicular to an axis of rotation of the drive shaft (GW1),
   the third planetary gear set (P3) comprises first, second and third elements (E13, E23, E33),
   the drive shaft (GW1) is permanently connected to the first element (E13) of the third planetary gear set (P3),
   the output shaft (GW2) is permanently connected to a ring gear (E32) of the second planetary gear set (P2),
   a ring gear (E31) of the first planetary gear set (P1) is permanently connected to a sun gear (E12) of the second planetary gear set (P2) and to the second element (E23) of the third planetary gear set (P3),
   a planet gear carrier (E21) of the first planetary gear set (P1) is permanently connected to a planet gear carrier (E22) of the second planetary gear set (P2),
   the drive shaft (GW1) is connectable to a sun gear (E11) of the first planetary gear set (P1) by actuating the first shift element (A),
   the third element (E33) of the third planetary gear set (P3) is rotationally fixable by actuating the second shift element (B),
   the sun gear (E12) of the second planetary gear set (P2) is rotationally fixable by actuating the third shift element (C),
   the planet gear carrier (E22) of the second planetary gear set (P2) is rotationally fixable by actuating the fourth shift element (D),
   the drive shaft (GW1) is connectable to the planet gear carrier (E22) of the second planetary gear set (P2) by actuating the fifth shift element (E),
   gear teeth (GW2A) are formed on the output shaft (GW2) to transfer power to a transmission-internal or transmission-external differential transmission (AG), where the gear teeth (GW2A) and the plurality of planetary gear sets (P1, P2, P3) are positioned in an axial sequential order of: the gear teeth (GW2A); the first and second planetary gear sets (P1, P2) in the common gear set plane (RSE); and the third planetary gear set (P3), and
   the first shift element (A) is axially between the gear set plane (RSE) and the third planetary gear set (P3).

2. The transmission (G) of claim 1, wherein the third planetary gear set (P3) is a negative gear set, the first element (E13) is a sun gear of the third planetary gear set (P3), the second element (E23) is a planet gear carrier of the third planetary gear set (P3), and the third element (E33) is a ring gear of the third planetary gear set (P3).

3. The transmission (G) of claim 1, wherein the third planetary gear set (P3) is a positive gear set, the first element (E13) is a sun gear of the third planetary gear set (P3), the second element (E23) is a ring gear of the third planetary gear set (P3), and the third element (E33) is a planet gear carrier of the third planetary gear set (P3).

4. The transmission (G) of claim 1, wherein the gear teeth (GW2A) of the output shaft (GW2) are axially between the fifth shift element (E) and the gear set plane (RSE).

5. The transmission (G) of claim 1, wherein the fifth shift element (E) is radially inside the gear teeth (GW2A) of the output shaft (GW2).

6. The transmission (G) of claim 1, wherein the transfer of power between the gear teeth (GW2A) of the output shaft (GW2) and the transmission-internal or transmission-external differential transmission (AG) is by a two stage spur gear set, by a chain drive, or by a single stage spur gear set and downstream planetary gear set.

7. The transmission (G) of claim 1, wherein the third shift element (C) is at least partially radially outside the first shift element (A).

8. The transmission (G) of claim 1, wherein the second shift element (B) and the first, second and third elements (E13, E23, E33) of the third planetary gear set (P3) are in a second plane (RSE3) that is perpendicular to the axis of rotation of the drive shaft (GW1).

9. The transmission (G) of claim 1, wherein the fourth shift element (D) is axially directly next to the third shift element (C).

10. The transmission (G) of claim 1, wherein the fourth shift element (D) is radially inside a rolling bearing (GW2L), the rolling bearing (GW2L) radially supporting the output shaft (GW2) with respect to a rotationally fixed component of the transmission (G).

11. The transmission (G) of claim 1, wherein the fourth shift element (D) is a positive engaging shift element.

12. The transmission (G) of claim 1, wherein the fourth shift element (D) is a non-positive engaging frictional shift element, friction surfaces of the non-positive engaging frictional shift element having no friction linings.

13. The transmission (G) of claim 1, further comprising an electric motor (EM).

14. The transmission (G) of claim 13, wherein the electric motor (EM) is arranged paraxially to the drive shaft (GW1) and has a rotor that is constantly connected to the drive shaft (GW1).

15. The transmission (G) of claim 13, wherein the electric motor (EM) is arranged paraxially to the drive shaft (GW1) and has a rotor that is in shiftable operative connection with the drive shaft (GW1) by a fixed gear ratio.

16. A drive train for a motor vehicle, the drive train comprising the transmission (G) of claim 1 and an internal combustion engine (VKM), wherein the drive shaft (GW1) of the transmission (G) is directly connected in a rotationally elastic manner to the internal combustion engine (VKM) by at least one transmission-internal or transmission-external torsional vibration damper (TS) or is connectable to the internal combustion engine (VKM) by a disconnect clutch (K0) and the at least one transmission-internal or transmission-external torsional vibration damper (TS), and wherein driving wheels (DW) of the motor vehicle are connected to output shafts of the transmission-internal or transmission-external differential transmission (AG).

* * * * *